R. R. ROBERTSON.
METHOD AND MEANS FOR EFFECTING WATER TIGHT JOINTS IN AQUEDUCTS AND THE LIKE.
APPLICATION FILED MAR. 24, 1915. RENEWED MAR. 1, 1919.
1,317,943.
Patented Oct. 7, 1919.
2 SHEETS—SHEET 1.
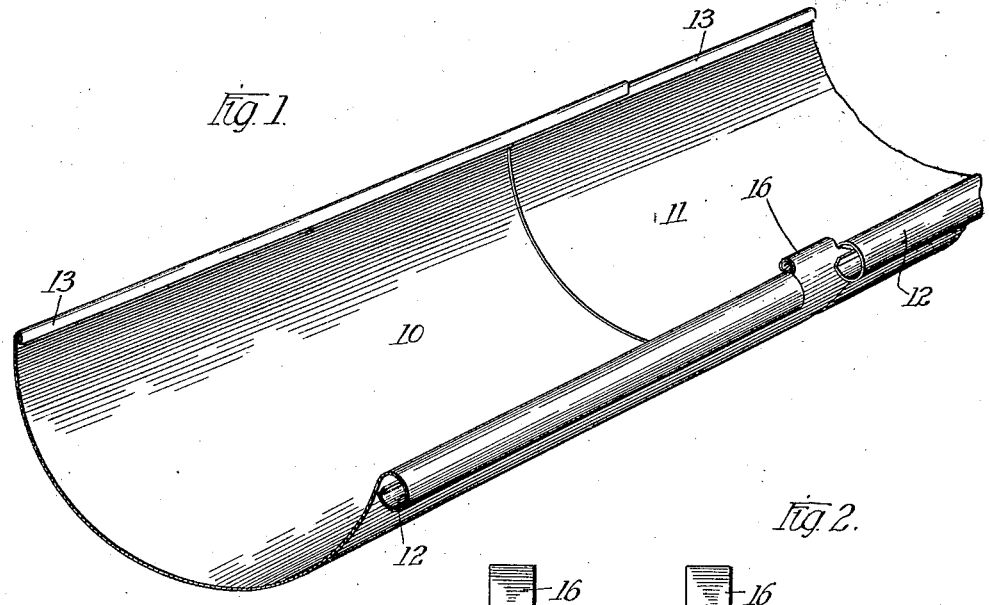
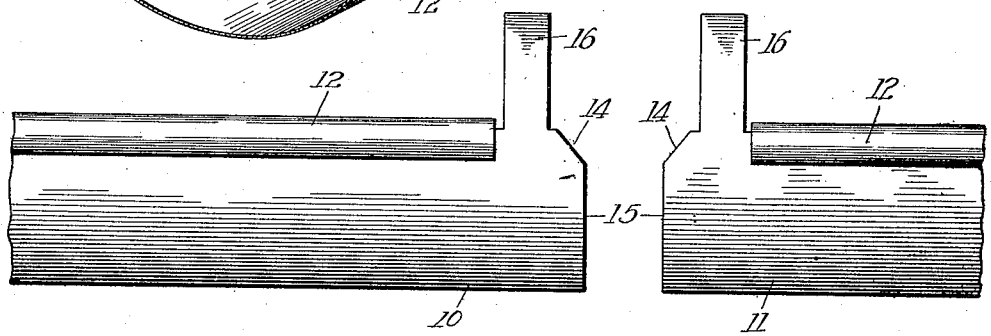
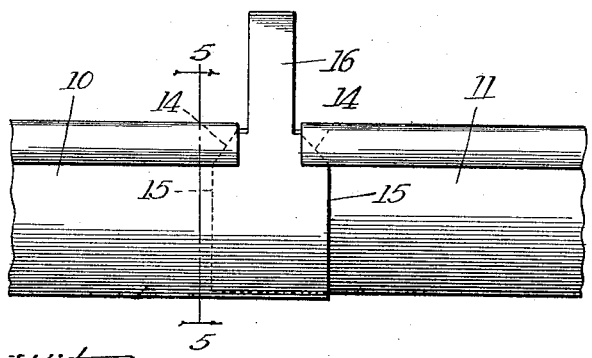
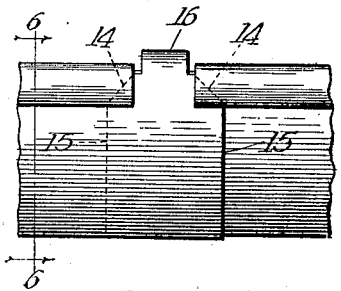
Witnesses:
Robert H. Weir
Inventor
Robert R. Robertson
By Jones, Addington, Ames and Seibold
Attys.

R. R. ROBERTSON.
METHOD AND MEANS FOR EFFECTING WATER TIGHT JOINTS IN AQUEDUCTS AND THE LIKE.
APPLICATION FILED MAR. 24, 1915. RENEWED MAR. 1, 1919.
1,317,943.
Patented Oct. 7, 1919.
2 SHEETS—SHEET 2.
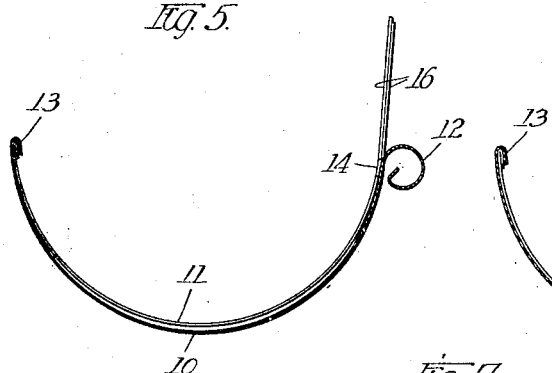
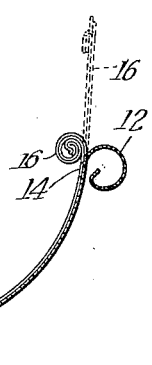
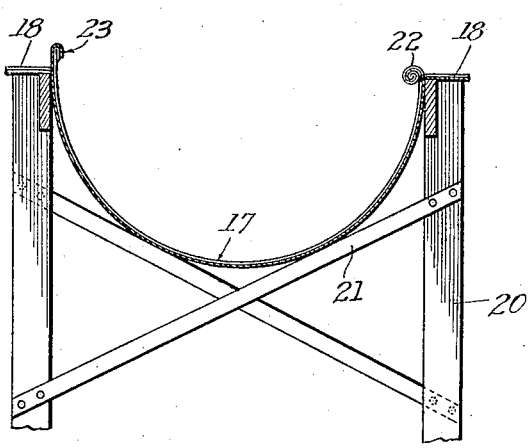
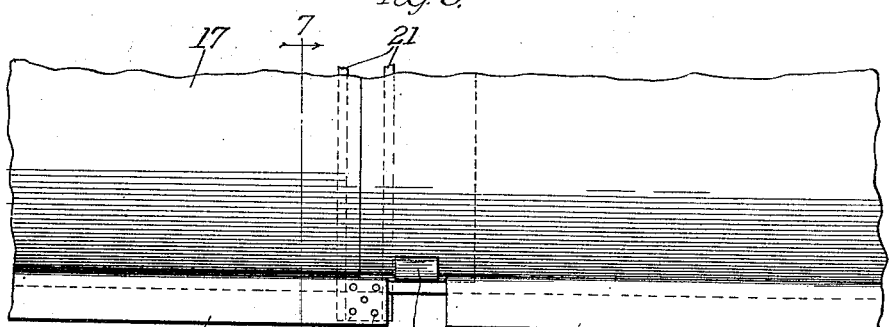

UNITED STATES PATENT OFFICE.

ROBERT R. ROBERTSON, OF LA GRANGE, ILLINOIS.

METHOD AND MEANS FOR EFFECTING WATER-TIGHT JOINTS IN AQUEDUCTS AND THE LIKE.

1,317,943.          Specification of Letters Patent.        Patented Oct. 7, 1919.

Application filed March 24, 1915, Serial No. 16,798. Renewed March 1, 1919. Serial No. 280,147.

*To all whom it may concern:*

Be it known that I, ROBERT R. ROBERTSON, a citizen of the United States, residing at La Grange, in the county of Cook and State of Illinois, have invented new and useful Improvements in Methods and Means for Effecting Water-Tight Joints in Aqueducts and the like, of which the following is a full, clear, concise, and exact description, reference being had to the accompanying drawing, forming a part of this specification.

My invention relates to an improved method for effecting a water tight joint between adjoining sections of eaves troughs, flumes and similar aqueducts, and to the means by which this method is carried out.

It is an object of my invention to provide a method and means for effecting a joint of the kind described such that the joint may be made readily, easily and quickly.

Further objects of my invention are to make it possible to effect this water tight joint for left or right-hand flow without entailing the use of particularly fashioned parts for the one flow or the other.

Additional objects and advantages of the invention will be apparent from the following description taken in connection with the appended claims.

I have described in the following specification and illustrated in the accompanying drawings the method and means of effecting a water tight joint in accordance with my invention, but it is to be understood that changes may be made in the various features involved, the combination of elements, and the arrangement of the parts without departing from the spirit of the invention or exceeding the scope of the appended claims, the embodiment of the invention herein described being merely an exemplification thereof.

In the drawings:

Figure 1 is a perspective view of the adjoining ends of the sections of an eaves trough after a water tight joint has been effected in accordance with my invention;

Fig. 2 is a view in front elevation of the adjacent ends of this trough before they are overlapped;

Figs. 3 and 4 are similar views showing the sections overlapped, before and after the tightening operation, respectively;

Fig. 5 is a cross sectional view taken on the line 5—5 of Fig. 3, looking in the direction of the arrows;

Fig. 6 is a similar view taken on the line 6—6 of Fig. 4, looking in the direction of the arrows;

Fig. 7 is a vertical cross sectional view of a flume to which the invention is applied, the section being taken on the line 7—7 of Fig. 8, looking in the direction of the arrows; and Fig. 8 is a top plan view of the same with parts broken away.

The method embraced in my invention may be disclosed by a description of a particular application thereof.

Referring to the drawings, therefore, 10 and 11 represent adjoining sections of an eaves trough. The outside edge, as is customary in stock troughing, terminates in a rounded bead-like portion 12 formed by coiling the edge of the metal over. At the inner edge is an inturned flange 13, formed by turning the edge back upon itself, on the inside, which forms a shoulder or abutment, the function of which is hereinafter set forth. Near the end of each section, from a point substantially at the base of the bead-like coil 12, the metal is cut away in a slanting line, as at 14, down to the end edge 15. A short distance from this cut away portion the bead-like coil 12 is cut or notched, leaving between the notch and the end, a narrow band of the coil which is unwound and bent to form a straight upright tongue 16. This work is preferably done at the shop before the trough is sent out for installation or for the market, but it may be done at any time prior to installation.

When a trough is to be set up, adjoining sections are overlapped so that water will flow over the joint rather than against it. Fig. 1 shows two sections arranged for left hand flow, with the right hand section overlapping the left hand section. The two sections are placed so that the flanged edge of the inner or superposed section engages the flange 13 of the outer section so as to bear against the shoulder or abutment formed by such flange, and so that the tongues 16 substantially coincide (Figs. 3 and 5). In this position of the parts there is a slight space between the two sections of the trough as it appears in Fig. 5.

The ends of the tongues are turned over inwardly (as shown by the dotted lines in Fig. 6) and are crimped together so as to lock the parts at that point against relative movement. Then the locked tongues are bent inwardly and coiled up as shown in Figs. 1 and 6. During this operation the opposite edges of the trough sections are locked against relative movement by the engagement of the flanged edge of the inner section 11 against the shoulder formed by the flange of the outer section 10. As a result the outer section is drawn up tightly against the inner section thus forming a water tight joint. The locking together of the tongues 16 prevents the parts from slipping after force is no longer applied so that the joint will remain tight.

In the drawings and above description the invention is applied to a trough arranged for a left hand flow. If a right hand flow is involved, instead of arranging the parts so that section 11 overlaps section 10, they are reversed so that section 10 overlaps section 11 with the flanged edge of section 10 engaging the shoulder formed by the flange of section 11. Subsequent operations and results are precisely the same as those above described, except that in this case section 10 is the inner section and section 11 the outer one. Thus it is seen that the same construction and operation may be used irrespective of the direction of flow.

In Figs. 7 and 8 is illustrated application of my invention to a flume. Each edge of the trough-like flume 17 terminates in a flat horizontal flange 18 which is nailed or otherwise secured, as at 19, to supports 20 braced by cross bars 21. On one side of the flume, near the adjoining ends of two adjacent sections of the flume, the flange of each section is cut to leave a narrow strip which is bent upright to form a tongue 22. On the opposite side of the flume the flange 18 is similarly cut to leave a strip which is bent upward, inwardly and downwardly to provide shoulder forming flanges 23. The sections are overlapped so that the tongues 22 substantially coincide and with the flanged edge 23 of the upper or inner section engaging the shoulder formed by the similar member of the lower or outer section, so as to lock the parts against relative movement. The ends of the coinciding tongues 22 are then bent over inwardly, crimped together, and turned or coiled inwardly, as shown in Figs. 7 and 8, to draw the outer section tightly against the inner section, the operation being as above described.

It is found that owing to contraction and expansion of flume bodies, the joints between adjoining sections become loose in course of time. Due to my invention, however, joints, if they should work loose, can be readily and easily tightened as it is only necessary to give a slight turn to the tongues 22. This re-tightening operation is more simple and easy still if the tongues are originally coiled up by means of some sort of an operating tool which is left in place for future operation.

It is to be understood that my invention is not to be limited in its application to the use of eaves troughs and flumes, as there are various similar and analogous aqueducts and the like to which it may be applied, its application to eaves troughs and flumes being given by way of illustration and example.

Having thus described my invention what I claim as new and desire to secure by Letters Patent is:—

1. The combination with two overlapping trough-like sections of aqueducts and the like, of means for locking against relative movement portions of the sections on one side of the central axis thereof, said sections having portions on the opposite side of the center of sufficient flexibility and so constructed and located relative to each other that one may be readily rolled about the other.

2. The combination with two overlapping trough-like sections of an aqueduct or the like, of means for locking against relative movement portions of the sections on one side of the central axis thereof, said sections having tongues on the opposite side of the center of sufficient flexibility and so constructed and located relative to each other that one may be readily rolled about the other.

3. The combination with two overlapping trough-like sections of an aqueduct or the like, of a shoulder forming member adjoining the edge of the lower section to be engaged by a similar member adjoining the corresponding edge of the upper section, said sections having tongues adjacent the opposite edges of the sections near the adjoining ends thereof of sufficient flexibility and so constructed and located relative to each other that one may be readily rolled about the other.

4. The combination with two adjoining trough-like sections of an aqueduct or the like having one edge thereof terminating in a bead, flange or the like, of an inwardly and downwardly turned flange on the opposite edge of each section, and a tongue on each section, near the adjoining ends thereof, cut and bent from said bead, flange or the like, said tongues being of sufficient flexibility and so constructed and located relative to each other that one may be readily rolled about the other.

In witness whereof I have hereunto subscribed my name.

ROBERT R. ROBERTSON.